(12) United States Patent
Song

(10) Patent No.: US 12,541,510 B1
(45) Date of Patent: *Feb. 3, 2026

(54) SYSTEM, METHOD, AND COMPUTER PROGRAM FOR AUGMENTING MULTI-TURN TEXT-TO-SQL DATASETS WITH SELF-PLAY

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/003,560

(22) Filed: Dec. 27, 2024

Related U.S. Application Data

(63) Continuation of application No. 17/899,080, filed on Aug. 30, 2022, now Pat. No. 12,222,936.

(51) Int. Cl.
| | |
|---|---|
| *G06F 16/00* | (2019.01) |
| *G06F 16/242* | (2019.01) |
| *G06F 16/2452* | (2019.01) |
| *G06F 16/9035* | (2019.01) |

(52) U.S. Cl.
CPC .... *G06F 16/24522* (2019.01); *G06F 16/2433* (2019.01); *G06F 16/9035* (2019.01)

(58) Field of Classification Search
None
See application file for complete search history.

(56) References Cited

U.S. PATENT DOCUMENTS

| | | |
|---|---|---|
| 2017/0154628 A1 | 6/2017 | Mohajer et al. |
| 2021/0303555 A1 | 9/2021 | Kim et al. |
| 2021/0390096 A1 | 12/2021 | Rahmfeld et al. |
| 2021/0390099 A1 | 12/2021 | Rahmfeld et al. |
| 2022/0084510 A1 | 3/2022 | Peng et al. |

OTHER PUBLICATIONS

Written Opinion issued Jul. 5, 2023 in International Application No. PCT/US23/16036.
International Search Report issued Jul. 5, 2023 in International Application No. PCT/US23/16036.

*Primary Examiner* — Alex Gofman
*Assistant Examiner* — Suman Rajaputra
(74) *Attorney, Agent, or Firm* — Sughrue Mion, PLLC

(57) ABSTRACT

A method, performed by at least one processor, and an apparatus for augmenting multi-turn text-to-SQL datasets is provided. The method and computer program code include generating an SQL-to-text model to converse with a text-to-SQL model, pre-training the SQL-to-text model and the text-to-SQL model based on input training data, sampling an SQL query as a goal query of an interaction between the SQL-to-text model and the text-to-SQL model, generating the interaction based on the goal query, a current utterance, previous utterances in the interaction, an SQL query from a preceding turn of the interaction, and a serialized database, filtering interactions based on a similarity score between the last turn of the interaction and the goal query, and re-training the SQL-to-text model and the text-to-SQL model based on the input training data and the filtered interactions.

17 Claims, 8 Drawing Sheets

SYSTEM, METHOD, AND COMPUTER PROGRAM FOR AUGMENTING MULTI-TURN TEXT-TO-SQL DATASETS WITH SELF-PLAY

CROSS-REFERENCE TO RELATED APPLICATION

This application is a continuation of U.S. application Ser. No. 17/899,080, filed on Aug. 30, 2022, the contents of which are incorporated herein by reference.

FIELD

Apparatuses and methods consistent with example embodiments of the present disclosure generally relate to the field of semantic parsing. More specifically, the present disclosure relates to context-dependent text-to-SQL translation which aims to convert multi-turn user utterances into executable SQL queries in a conversational environment with self-play.

BACKGROUND

Multi-turn text-to-SQL translation is a powerful semantic parsing paradigm that converts natural language user utterances into executable SQL queries. Compared to conventional text-to-SQL tasks (e.g., Spider and GeoQuery), conversational text-to-SQL translation requires interpreting co-reference and omission phenomena that frequently appear in human conversations. To be effective, conventional text-to-SQL models must uncover complex contextual dependencies while grounding user utterances in task specific database schemas. In related art, architectures and pre-training methods for tackling context-dependent text-to-SQL task are limited due to the size of the datasets used and the high cost of annotating multi-turn dialogue and SQL pairs, which often requires trained experts. Multi-turn text-to-SQL datasets in related art also require the model to generalize to unseen databases during testing, however doing so is difficult with limited training context. Therefore, converting multi-turn user utterances to formal SQL queries is a challenging task due to both the scarcity of training data from which to learn complex contextual dependencies and to generalizing to unseen databases. As such, there is a need to provide a method of process that achieves more robust generalization and improved semantic parsing.

SUMMARY

According to embodiments, methods are provided for augmenting multi-turn text-to-SQL datasets with self-play.

According to an aspect of the disclosure, a method for augmenting multi-turn text-to-SQL datasets is performed by at least one processor. The method includes generating an SQL-to-text model to converse with a text-to-SQL model; pre-training the SQL-to-text model and the text-to-SQL model based on input training data; sampling an SQL query as a goal query of an interaction between the SQL-to-text model and the text-to-SQL model; generating the interaction based on the goal query, a current utterance, previous utterances in the interaction, an SQL query from a preceding turn of the interaction, and a serialized database; and filtering the interaction based on a last turn of the interaction and the goal query, wherein the interaction is kept or filtered out based on a similarity score between the last turn of the interaction and the goal query.

The method may further include sampling the SQL query as the goal query includes building SQL templates using SQL queries in the input training data by replacing column and value mentions in the SQL queries with typed slots, and sampling an unseen database and fill the typed slots with columns and values from the sampled unseen database to form the goal query.

The method may further include concatenating the goal query with an empty context and a schema from the serialized database to generate a first value, and inputting the first value into the SQL-to-text model to produce a first user utterance of the interaction.

The method may further include padding an utterance from the last turn of the interaction with a stop interaction symbol, wherein the interaction ends when the SQL-to-text model decodes the stop interaction symbol.

In some embodiments, when the similarity score is above a threshold value, the interaction may be determined to be grounded to the goal query and the interaction is kept, and when the similarity score is below the threshold value, the interaction may be determined not to be grounded to the goal query and the interaction is filtered out.

The method may further include re-training the SQL-to-text model and the text-to-SQL model based on the input training data and the filtered interaction.

The method may further include generating a next utterance in the interaction using the SQL-to-text model by concatenate the goal query, the SQL query from the preceding turn of the interaction, the previous utterances in the interaction, and a schema of the serialized database.

According to another aspect of the disclosure, an apparatus for augmenting multi-turn text-to-SQL datasets, including at least one memory configured to store computer program code and at least one processor configured to read the computer program code and operate as instructed by the computer program code, is provided. The computer program code including generating code configured to cause the at least one processor to generate an SQL-to-text model to converse with a text-to-SQL model; training code configured to cause the at least one processor to pre-train the SQL-to-text model and the text-to-SQL model based on input training data; first sampling code configured to cause the at least one processor to sample an SQL query as a goal query of an interaction between the SQL-to-text model and the text-to-SQL model; synthetic interaction generating code configured to cause the at least one processor to generate the interaction based on the goal query, a current utterance, previous utterances in the interaction, an SQL query from a preceding turn of the interaction, and a serialized database; and filtering code configured to cause the at least one processor to filter the interaction based on a last turn of the interaction and the goal query, wherein the interaction is kept or filtered out based on a similarity score between the last turn of the interaction and the goal query.

The apparatus may further include building code configured to cause the at least one processor to build SQL templates using SQL queries in the input training data by replacing column and value mentions in the SQL queries with typed slots; and second sampling code configured to cause the at least one processor to sample an unseen database and fill the typed slots with columns and values from the sampled unseen database to form the goal query.

The apparatus may further include concatenating code configured to cause the at least one processor to concatenate the goal query with an empty context and a schema from the serialized database to generate a first value; and first user utterance code configured to cause the at least one processor to input the first value into the SQL-to-text model to produce a first user utterance of the interaction.

The apparatus may further include stopping code configured to cause the at least one processor to pad an utterance from the last turn of the interaction with a stop interaction symbol, wherein the interaction ends when the SQL-to-text model decodes the stop interaction symbol.

In some embodiments, when the similarity score is above a threshold value, the interaction may be determined to be grounded to the goal query and the interaction may be kept, and when the similarity score is below the threshold value, the interaction may be determined not to be grounded to the goal query and the interaction may be filtered out.

The apparatus may further include re-training code configured to cause the at least one processor to re-train the SQL-to-text model and the text-to-SQL model based on the input training data and the filtered interaction.

The apparatus may further include utterance generating code configured to cause the at least one processor to generate a next utterance in the interaction using the SQL-to-text model by concatenate the goal query, the SQL query from the preceding turn of the interaction, the previous utterances in the interaction, and a schema of the serialized database.

According to another aspect of the disclosure, a non-transitory computer-readable medium storing instructions that are executed by at least one processor, of an apparatus for augmenting multi-turn text-to-SQL datasets, is provided. The instructions cause the at least one processor to generate an SQL-to-text model to converse with a text-to-SQL model; pre-train the SQL-to-text model and the text-to-SQL model based on input training data; sample an SQL query as a goal query of an interaction between the SQL-to-text model and the text-to-SQL model; generate the interaction based on the goal query, a current utterance, previous utterances in the interaction, an SQL query from a preceding turn of the interaction, and a serialized database; and filter the interaction based on a last turn of the interaction and the goal query, wherein the interaction is kept or filtered out based on a similarity score between the last turn of the interaction and the goal query.

In some embodiments, the instructions may further cause the at least one processor to build SQL templates using SQL queries in the input training data by replacing column and value mentions in the SQL queries with typed slots, and sample an unseen database and fill the typed slots with columns and values from the sampled unseen database to form the goal query.

In some embodiments, the instructions may further cause the at least one processor to concatenate the goal query with an empty context and a schema from the serialized database to generate a first value; input the first value into the SQL-to-text model to produce a first user utterance of the interaction; and pad an utterance from the last turn of the interaction with a stop interaction symbol, wherein the interaction ends when the SQL-to-text model decodes the stop interaction symbol.

When the similarity score is above a threshold value in some embodiments, the interaction may be determined to be grounded to the goal query and the interaction may be kept, and when the similarity score is below the threshold value, the interaction may be determined not to be grounded to the goal query and the interaction may be filtered out.

The non-transitory computer-readable medium may further include instructions that further cause the at least one processor to re-train the SQL-to-text model and the text-to-SQL model based on the input training data and the filtered interaction.

The non-transitory computer-readable medium may further include instructions that further cause the at least one processor to generate a next utterance in the interaction using the SQL-to-text model by concatenate the goal query, the SQL query from the preceding turn of the interaction, the previous utterances in the interaction, and a schema of the serialized database.

Additional embodiments will be set forth in the description that follows and, in part, will be apparent from the description, and/or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
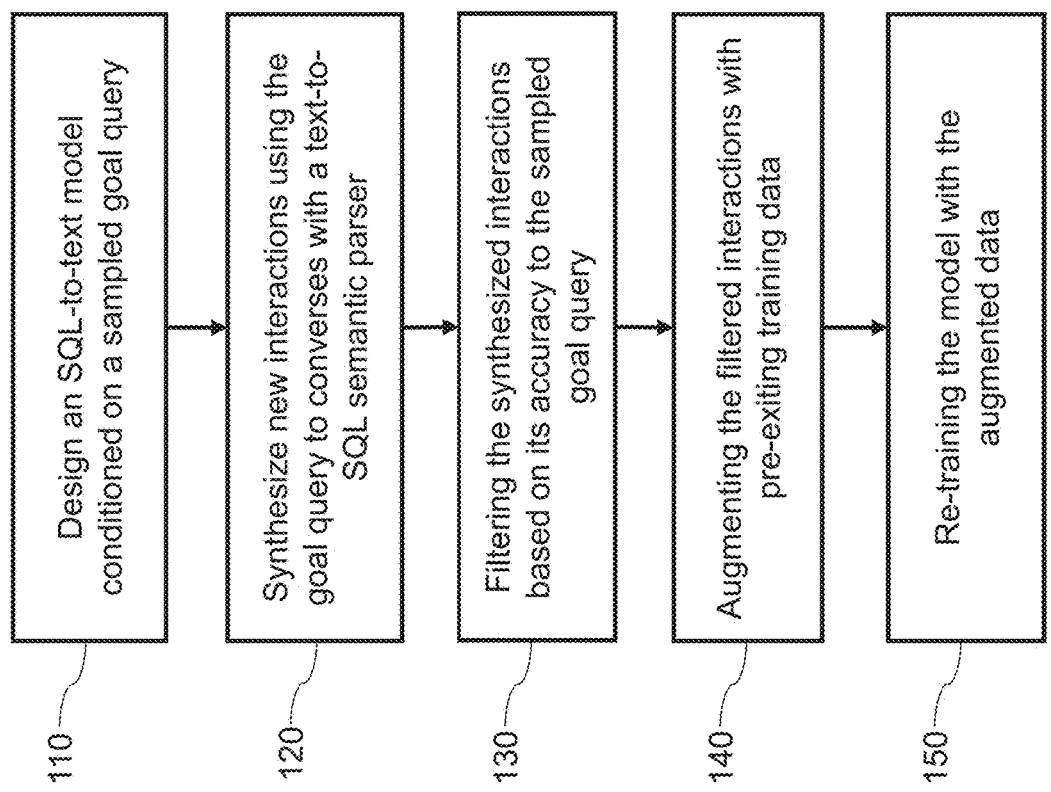
FIG. 1 an example process utilized by a system according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and an apparatus for augmenting multi-turn text-to-SQL datasets with self-play in order to achieve improved generalization. Training datasets are augmented with self-play to leverage contextual information to synthesize new interactions and adapt the model to new databases.

FIG. 1 a flowchart of an example process utilized by a system according to embodiments.

First, at S110, the system designs an SQL-to-text model that is conditioned on a sampled goal query and designs a text-to-SQL model that generates a corresponding SQL to the utterances from the SQL-to-text model. The sampled goal query represents a user's intent (e.g., a question that may be asked by a user). At S120, new interactions are synthesized using the goal query. The text-to-SQL model converses with the SQL-to-text model to simulate the new interactions. At S130, the synthesized interactions are filtered based on their accuracy to the sampled goal. At S140, the filtered interactions from S130 are augmented with pre-exiting training data. Finally, at S150, self-training is employed to re-trained text-to-SQL model and the SQL-to-text model with the augmented data. In this manner, according to embodiments, a new SQL-to-text model may be trained using previous utterances, the goal query, and the filtered synthesized interactions. This approach of re-training and using self-play to augment training datasets improves the accuracy of strong baselines (e.g., on SParC and CoSQL; two widely used cross-domain text-to-SQL datasets), simulates various conversational thematic relations, enhances cross-domain generalization, and improves beam-search.

Figure 2:
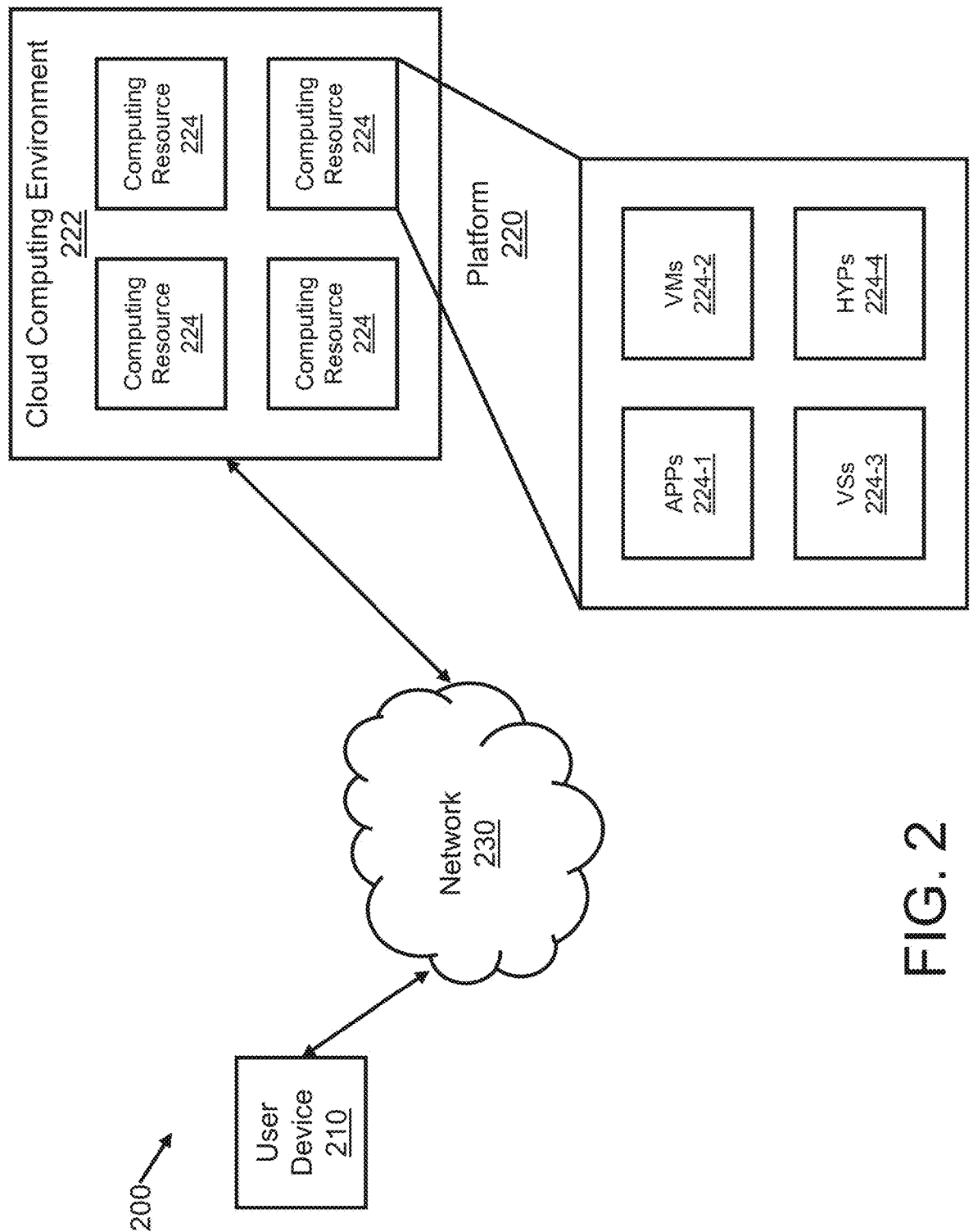
FIG. 2 is a diagram of an environment in which methods, apparatuses and systems described herein may be implemented according to embodiments.

FIG. 2 is a diagram of an environment 200 in which methods, apparatuses and systems described herein may be implemented, according to embodiments.

As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
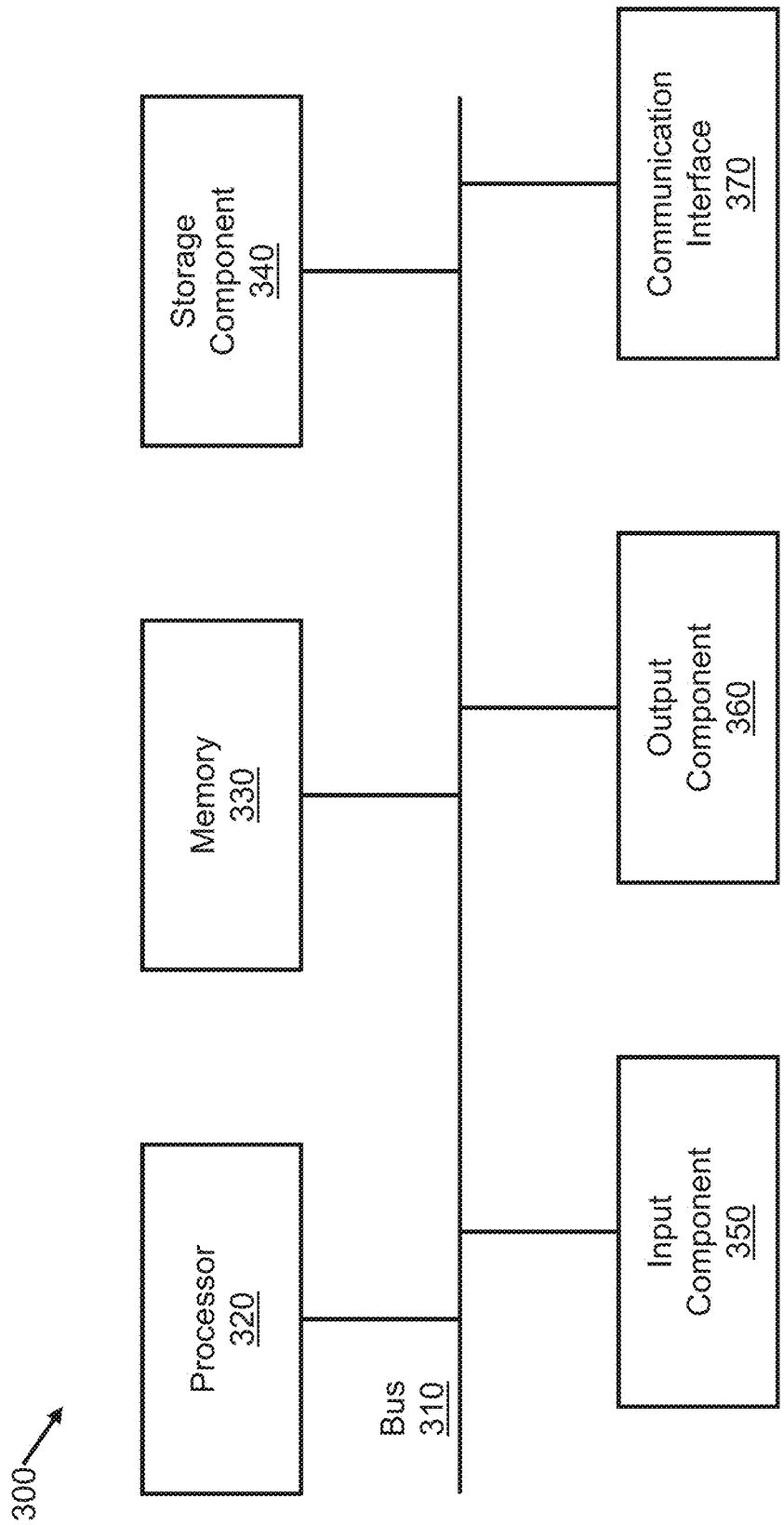
FIG. 3 is a block diagram of example components of one or more devices of FIG. 2.

FIG. 3 is a block diagram of example components of one or more devices of FIG. 2.

A device 300 may correspond to the user device 210 and/or the platform 220. As shown in FIG. 3, the device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, software, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
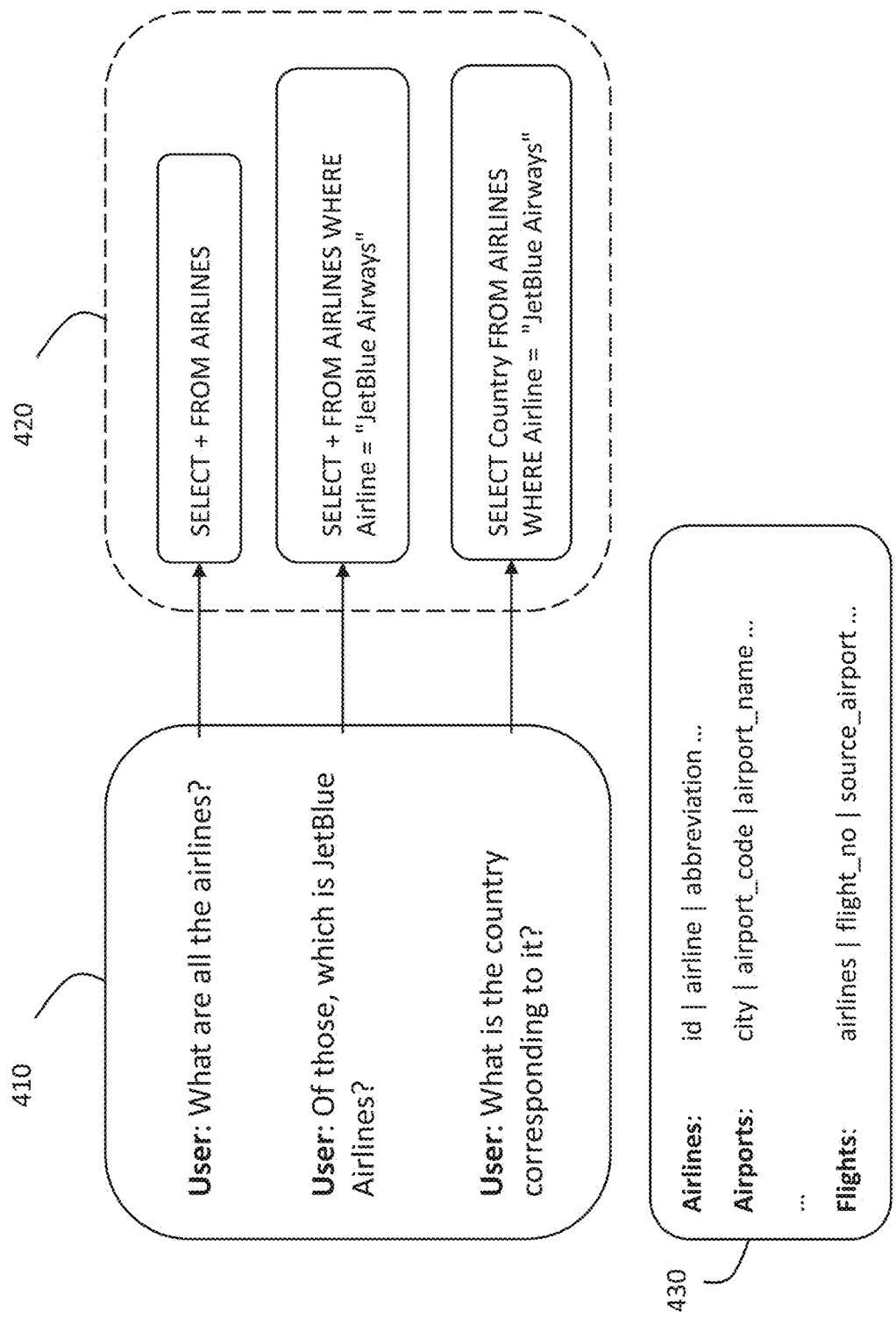
FIG. 4 is an example block diagram of a multi-turn text-to-SQL dataset augmenting apparatus according to embodiments.
Figure 5:
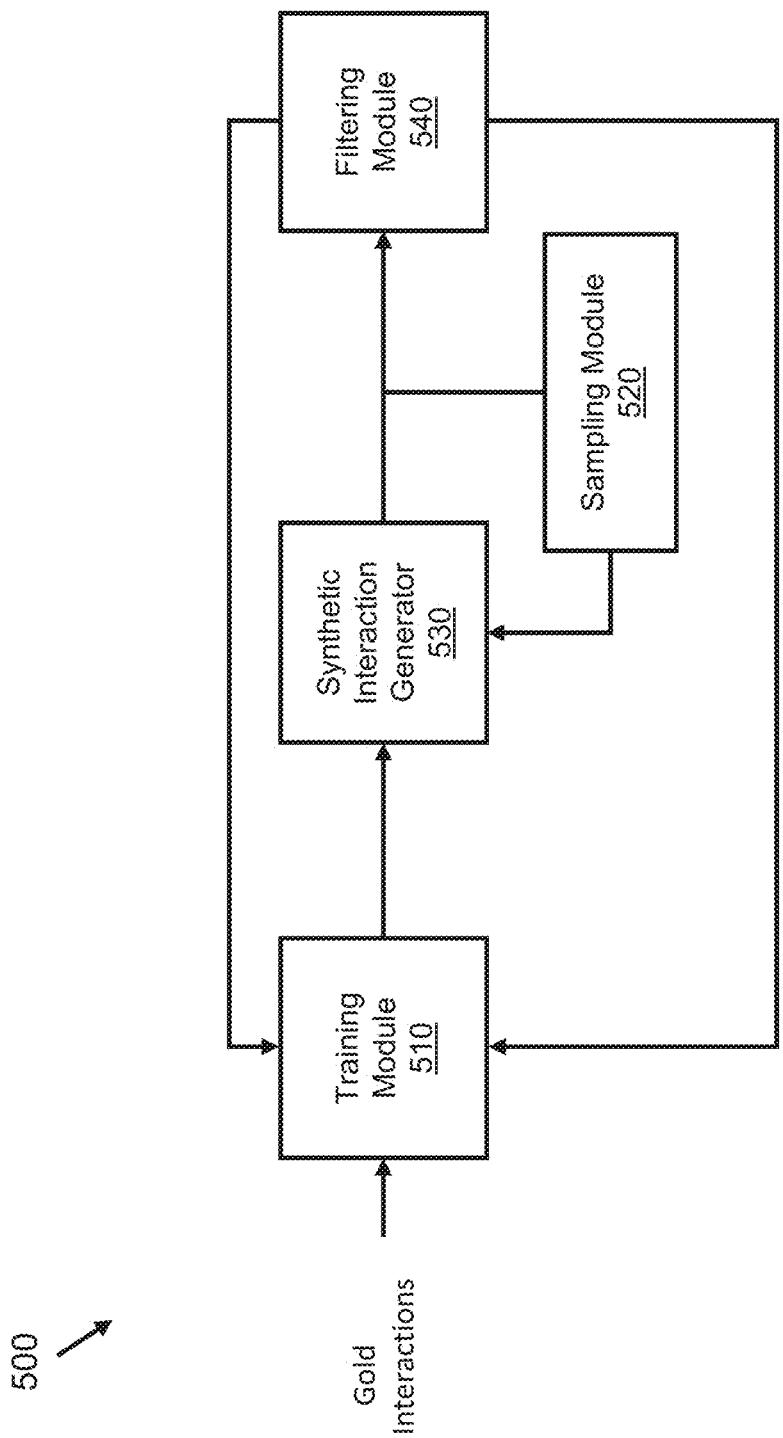
FIG. 5 is an example of a synthetic interaction between the SQL-to-text model and the text-to-SQL model according to embodiments.
Figure 6:
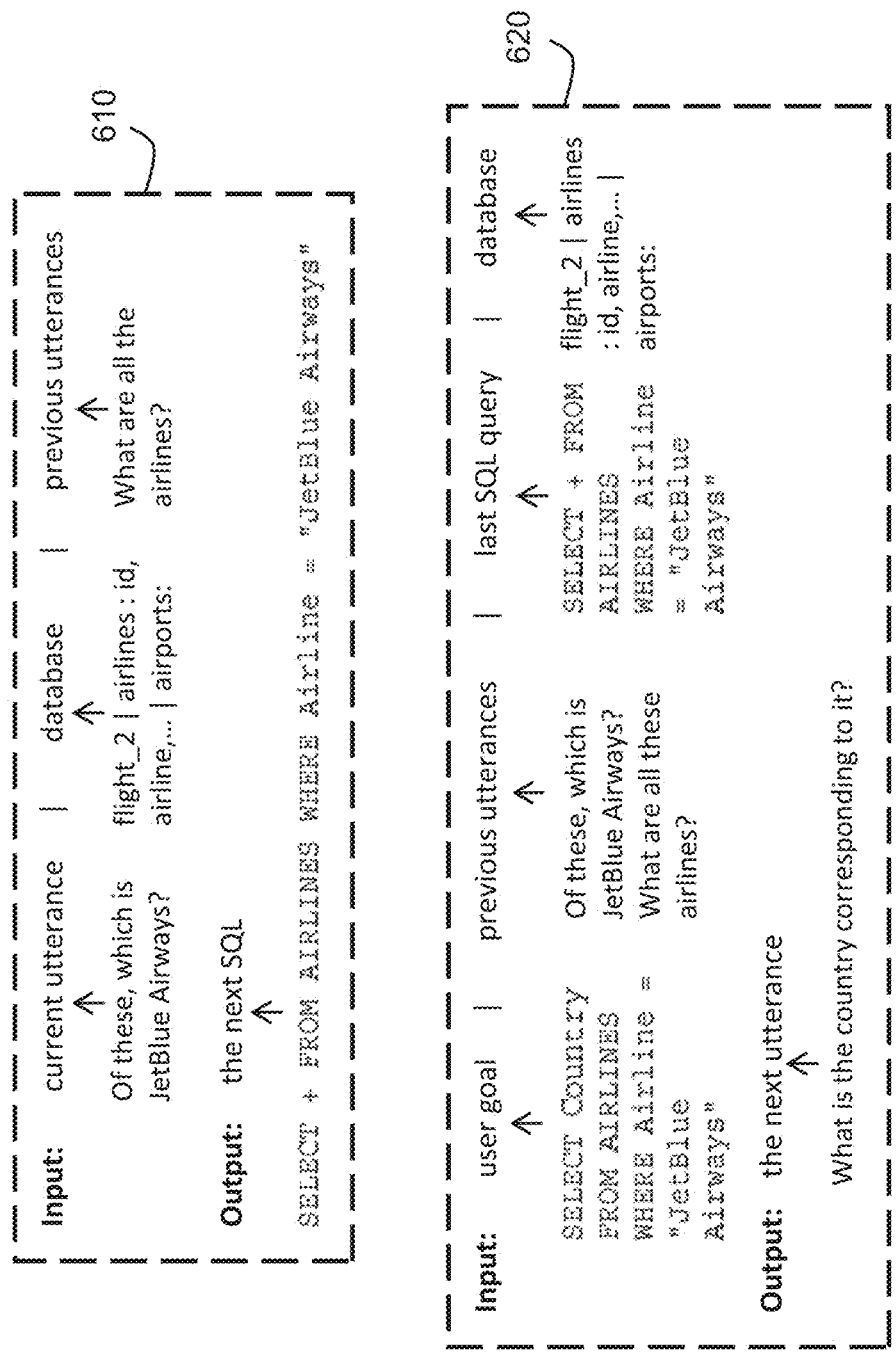
FIG. 6 is an example of inputs to the trained SQL-to-text and the text-to-SQL models and outputs generated by the trained SQL-to-text and the text-to-SQL models.

In embodiments, any one of the operations or processes of FIGS. 4-6 may be implemented by or using any one of the elements illustrated in FIGS. 2 and 3.

To conduct self-play for data augmentation in conversational text-to-SQL semantic parsing, first an SQL-to-text model is designed. A user simulator, which is a SQL-to-text model, is designed to converse with a text-to-SQL model to generate synthetic interactions (i.e., synthetic conversation). The SQL-to-text model aims to generate the next utterance given all interactive history, while the text-to-SQL model generates the corresponding SQL to the latest utterance from the SQL-to-text model. A parsing model such as, e.g., Parsing Incrementally for Constrained Auto-Regressive Decoding (PICARD) may be used as the base of the text-to-SQL model.

At each turn t of the user simulator, the user simulator produces a meaningful question that would naturally be asked by a human user. In each turn, a user has a goal to achieve. The SQL-to-text model is explicitly conditioned on the user's goal to encourage the user simulator to ask questions that are grounded to this goal. The SQL-to-text model calculates the following conditional at each turn:

$$p(U_t|Q_{t-1},C_t,G,D) \qquad \text{(Equation 1)}$$

where $U_t$ is a next user utterance, $Q_{t-1}$ is the last SQL query of the previous turn, context $C_t$ contains the previous user utterances $U_{<t}$, G is the user goal query, and D is a serialized database schema. FIG. 4 is an example of a synthetic interaction between the SQL-to-text model and the text-to-SQL model. Utterances 410 represent the questions produced by the user simulator. SQL Queries 420 represent the SQL corresponding to the utterances 410. Database 430 represents a serialized database schema. The database 430 may define how data is organized, relationship between utterances or user queries and SQL queries, data types, labels, etc.

During training of the SQL-to-text model, the user goal G is the SQL query of the final turn T (i.e., $Q_T$). During inferencing of the SQL-to-text model, a new goal query is sampled. A machine learning (ML) approach is employed to process the SQL-to-text model. For example, an interaction from SParC to Sequence to Sequence (seq2seq) formats. Further, a Text-to-Text Transfer Transformer (T5) model may be used to parameterize the SQL-to-text model. In SQL-to-text, there may be multiple reasonable questions to ask for the next turn (i.e., a one-to-many relation). A well-trained SQL-to-text model can generate new questions that increase the diversity of user dialogue flows in the dataset, and thereby improve generalization.

FIG. 5 is an example block diagram of a multi-turn text-to-SQL dataset augmenting apparatus 500 according to embodiments. The apparatus 500 includes a training module 510, a sampling module 520, a synthetic interaction generator 530, and a filtering module 540.

The training module 510 trains both the text-to-SQL and SQL-to-text models on gold training data. The gold training data may including dialogues, etc. The models are trained by minimizing the negative log likelihood. The trained text-to-SQL and SQL-to-text models are output by the training module 510. With the models pre-trained on the gold training data, synthetic interactions are generated using self-play.

An SQL query is specified by the sampling module 520 as the eventual goal query of the interaction. Specifically, the sampling module 520 samples the SQL query to synthesize the user goal query G and outputs the user goal query G in sampled logical form to the synthetic interaction generator 530 and the filtering module 540. The sampling module 520 may build and sample coarse SQL templates with the SQLs in a training set by replacing the column and value mentions in the queries with typed slots. For example, "SELECT T1.id, T2.name" is converted to the template "SELECT key1, text1". To adapt the models to an unseen environment, an unseen database is sampled and the typed slots are filled in with columns and values from the sampled database to form a new SQL query. The new SQL query may be used as the user goal query G. This approach of sampling is used to synthesize goals in new domains for cross-domain generalization.

The synthetic interaction generator 530 then conditions the SQL-to-text model based on the user goal query G and the text-to-SQL model converses with the conditioned SQL-to-text model to simulate a new interaction. The sampled user goal query G is then concatenated with an empty context and a serialized schema and feed it into the SQL-to-text model to produce the first user utterance. The text-to-SQL model and SQL-to-text model may continue to simulate the synthetic interaction until the end of the conversation. Its target label is the correct user utterance for the next turn. The last utterance of the synthetic interaction is padded with a special stop-of-interaction symbol, indicating the end of the conversation. FIG. 6 illustrates Blocks 610 and 620 illustrate example inputs/outputs to the trained text-to-SQL model and SQL-to-text model, respectively, in a turn of the synthetic interaction. As shown in FIG. 6, an input to the text-to-SQL model may be: "current utterance | database previous utterances". Based on the synthetic interaction shown in FIG. 4, e.g., in a turn of the simulator the current utterance may be "Of these, which is JetBlue Airways?", the serialized database schema utilized for this example may be "fight_2| Airlines: id | airline, . . . | Airports: . . . ", and the previous utterances may be "What are all the airlines?". Using the input parameters, the text-to-SQL model generates an output (i.e., the next SQL) being "SELECT+FROM AIRLINES WHERE Airline='JetBlue Airways'". As defined by Equation 1, the user goal G, the last SQL query $Q_{t-1}$, the previous user utterances $U_{<t}$, and the serialized database schema D are concatenated and used to predict the next user utterance $U_t$ using the trained SQL-to-Text model. Moreover, an input to the SQL-to-text model may be: "user goal | previous utterances | last SQL query | database". Based on the synthetic interaction in FIG. 4, e.g., the user goal may be "SELECT Country FROM AIRLINES WHERE Airline='JetBlue Airways'", the previous utterances may be "What are all the airlines? Of those, which is JetBlue Airlines?", the last SQL query may be "SELECT+FROM AIRLINES WHERE Airline='JetBlue Airways'", and the serialized database schema utilized for this example may be "fight_2 | Airlines: id | airline, . . . | Airports: . . . " Using the input parameters, the SQL-to-text model generates an output (i.e., the next utterance) being "What is the country corresponding to it?". In this way, self-play is used to generate the synthetic interactions. A synthetic interaction ends whenever the SQL-to-text model decodes the stop-of-interaction symbol. Once the stop-of-interaction symbol is decoded, the synthetic interaction generator 530 outputs the synthetic interaction, which is used an input to the filtering module 540.

Although the SQL-to-text model is conditioned based on the user goal query G, synthetic interactions generated by self-play may diverge from the sampled user goal query. To account for the potential divergence, the filtering module 540 filters out the interactions that are not grounded to the sampled user goal queries. To filter these low-quality conversations (i.e., interactions that are not grounded to the sampled goal queries), the generated SQL query of the final turn $Q_T$ is compared with the sampled user goal query G using a similarity score, score ($Q_T$, G). The SQL query of the final turn $Q_T$ and sampled user goal query G are decomposed into SQL substructures $Q_{Ts}$ and $G_s$ (e.g., "select, where, group_by, order_by" statements), respectively. The filtering module 540 then calculates the accuracy of each of the substructures $Q_{Ts}$ and $G_s$. In some embodiments, the similarity score may be the average of the accuracy over all substructures. If the similarity score is larger than a threshold value @, the filtering module 540 keeps the synthetic interaction. A high similarity score means that the synthetic interaction is grounded to the sampled goal query. If the similarity score is less than the threshold value @, the synthetic interaction is filtered out. A low similarity score means that the synthetic interaction is not grounded to the sampled goal query.

The filtered synthetic interactions are used to retrain the text-to-SQL and SQL-to-text models. The apparatus 400 employs self-training to retrain the text-to-SQL model and the SQL-to-text model. As such, a new text-to-SQL model and a new SQL-to-text model are re-trained at the end of each iteration through the framework of the apparatus 400 (as described above) with both the gold training data and the filtered synthetic interactions.

Table 1 shows the overall procedures (i.e., algorithm) followed by the re-training process. The complete self-play and self-training processes are detailed with reference to FIGS. 4-6. Table 1 shows an process of self-training wherein the models are re-trained with their own outputs. The text-to-SQL and SQL-to-text models may be re-trained in one of two ways. The first approach would be to pre-train the text-to-SQL model and SQL-to-text model on the synthetic interactions before fine-tuning the models based on the gold interaction. The second approach would be to combine the filtered synthetic data with the gold interactions before pre-training the text-to-SQL and SQL-to-text models. Table 1 uses the first approach. The first approach performs slightly better than the second approach.

TABLE 1

| Re-training Algorithm |
| --- |
| Input: Gold interactions I, # iteration k for synthetic data generation, threshold ω. |
| Output: A text-to-SQL model and a SQL-to-text model. |
| Pre-train a text-to-SQL model p ($Q_t$ | $U_t$, $C_t$, D) and a SQL-to-text model |
| p ($U_t$ | $Q_{t-1}$, $C_t$, G, D) on I. |
| I' = 0 |
| for i in (1, ..., k) do |
|     Sample a goal query G. |
|     Generate a synthetic interaction $I_S$ by self-play between text-to-SQL and SQL-to-text. |
|     Calculate score($Q_T$, G) on $I_S$. |
|     if score($Q_T$, G) > ω then |
|         Add $I_S$ to I' |
|     Re-train p ($Q_t$| $U_t$, $C_t$, D) and p ($U_t$ | $Q_{t-1}$, $C_t$, G, D) on I ∪ I'. |
| return the re-trained text-to-SQL model and the SQL-to-text model. |

Figure 7:
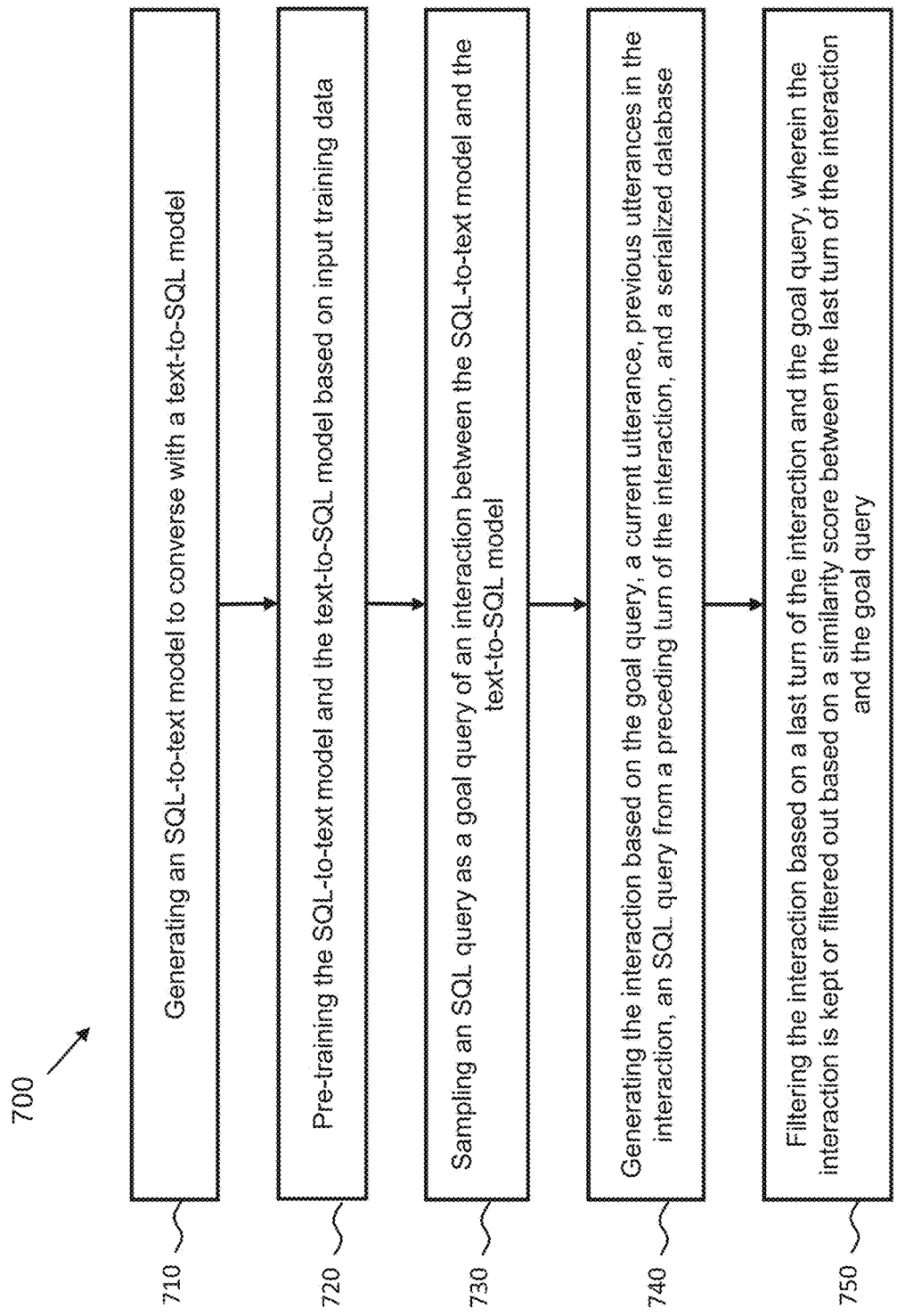
FIG. 7 is an exemplary flowchart illustrating a method for augmenting multi-turn text-to-SQL datasets with self-play according to embodiments.

FIG. 7 is an exemplary flowchart illustrating a method 700 for augmenting multi-turn text-to-SQL datasets, according to embodiments.

In some implementations, one or more process blocks of FIG. 7 may be performed by the platform 220. In some implementations, one or more process blocks of FIG. 7 may be performed by another device or a group of devices separate from or including the platform 220, such as the user device 210.

As shown in FIG. 7, in operation 710 the method includes generating an SQL-to-text model to converse with a text-to-SQL model.

In operation 720, the method 700 includes pre-training the SQL-to-text model and the text-to-SQL model based on input training data.

In operation 730, the method 700 includes sampling an SQL query as a goal query of an interaction between the SQL-to-text model and the text-to-SQL model. In some embodiments, the SQL query may be sampled by first building SQL templates using SQL queries in the input training data. The SQL templates are built by replacing column and value mentions in the SQL queries with typed slots. Then, an unseen database is sampled and the typed slots are filled with columns and values from the sampled unseen database to generate the goal query.

In operation 740, the method 700 includes generating the interaction (i.e., synthetic interactions) based on the goal query, a current utterance, previous utterances in the interaction, an SQL query from a preceding turn of the interaction, and a serialized database. The first user utterance in the interaction is generated by concatenating the goal query with an empty context and a schema from the serialized database. Then, inputting the concatenated value into the SQL-to-text model to produce the first user utterance of the interaction.

The next utterance in the interaction is generated using the SQL-to-text model by concatenate the goal query, the SQL query from the preceding turn of the interaction, the previous utterances in the interaction, and a schema of the serialized database. The last utterance, i.e., an utterance from the last turn of the interaction, is padded with a stop interaction symbol. The interaction ends when the SQL-to-text model decodes the stop interaction symbol.

In operation 750, the method 700 includes filtering the interaction based on a last turn of the interaction and the goal query, wherein the interaction is kept or filtered out based on a similarity score between the last turn of the interaction and the goal query. When the similarity score is above a threshold value, the interaction is determined to be grounded to the goal query and the interaction is kept. When the similarity score is below the threshold value, the interaction is determined not to be grounded to the goal query and the interaction is filtered out. After filtering the generated interactions, the SQL-to-text model and the text-to-SQL model are re-trained based on the input training data and the filtered interaction.

Although FIG. 7 shows example blocks of the method, in some implementations, the method may include additional blocks, fewer blocks, different blocks, or differently arranged blocks than those depicted in FIG. 7. Additionally, or alternatively, two or more of the blocks of the method may be performed in parallel.

Figure 8:
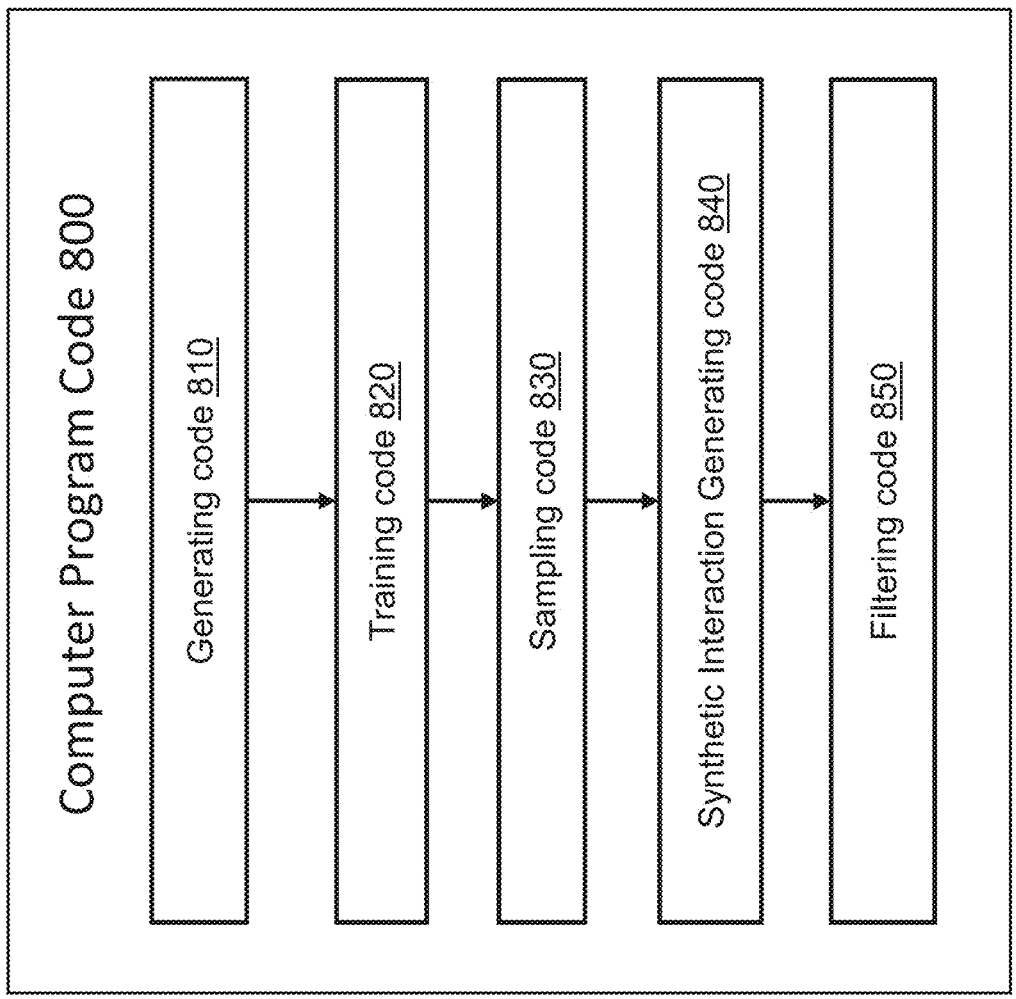
FIG. 8 is a block diagram of an example of computer code for augmenting multi-turn text-to-SQL datasets with self-play according to embodiments.

FIG. 8 is a block diagram of an example of computer program code 800 for augmenting multi-turn text-to-SQL datasets, according to embodiments. According to embodiments of the present disclosure, an apparatus/device including at least one processor with memory storing computer program code may be provided. The computer program code may be configured to, when executed by the at least one processor, perform any number of aspects of the present disclosure.

As shown in FIG. 8, the computer program code 800 includes generating code 810, training code 820, sampling code 830, synthetic interaction generating code 840, and filtering code 850.

The generating code 810 is configured to cause the at least one processor to generate an SQL-to-text model to converse with a text-to-SQL model.

The training code 820 is configured to cause the at least one processor to pre-train the SQL-to-text model and the text-to-SQL model based on input training data.

The sampling code 830 is configured to cause at least one processor to sample an SQL query as a goal query of an interaction between the SQL-to-text model and the text-to-SQL model. The computer program code 800 may even further include building code configured to cause the at least one processor to build SQL templates using SQL queries in the input training data by replacing column and value mentions in the SQL queries with typed slots, and second sampling code configured to cause the at least one processor to sample an unseen database and fill the typed slots with columns and values from the sampled unseen database to form the goal query.

The synthetic interaction generating code 840 is configured to cause at least one processor to generate the interaction based on the goal query, a current utterance, previous utterances in the interaction, an SQL query from a preceding turn of the interaction, and a serialized database. The computer program code 800 may even further include concatenating code configured to cause the at least one processor to concatenate the goal query with an empty context and a schema from the serialized database to generate a first value, first user utterance code configured to cause the at least one processor to input the first value into the SQL-to-text model to produce a first user utterance of the interaction. The computer program code 800 may even further include utterance generating code configured to cause the at least one processor to generate a next utterance in the interaction using the SQL-to-text model by concatenate the goal query, the SQL query from the preceding turn of the interaction, the previous utterances in the interaction, and a schema of the serialized database, and stopping code configured to cause the at least one processor to pad an utterance from the last turn of the interaction with a stop interaction symbol, wherein the interaction ends when the SQL-to-text model decodes the stop interaction symbol.

The filtering code 850 is configured to cause at least one processor to filter the interaction based on a last turn of the interaction and the goal query, wherein the interaction is kept or filtered out based on a similarity score between the last turn of the interaction and the goal query. When the similarity score is above a threshold value, the interaction is determined to be grounded to the goal query and the interaction is kept. When the similarity score is below the threshold value, the interaction is determined not to be grounded to the goal query and the interaction is filtered out.

The computer program code 800 may even further include re-training code configured to cause the at least one processor to re-train the SQL-to-text model and the text-to-SQL model based on the input training data and the filtered interaction.

Although FIG. 8 shows example blocks of the apparatus, in some implementations, the apparatus may include additional blocks, fewer blocks, different blocks, or differently arranged blocks than those depicted in FIG. 8. Additionally, or alternatively, two or more of the blocks of the apparatus may be combined. In other words, while FIG. 8 shows distinct blocks of code, the various code instructions need not be distinct and could be intermingled.

The methods and processes of self-play described according to embodiments of the disclosure may be extended to semantic parsing, however, may also be successfully applied in a wide range of tasks (e.g. board games and multiplayer battle games). When evaluated on two large-scale benchmark datasets (e.g., SParC and CoSQL), as shown in Table 2, the configuration "w/PICARD w/self-play" achieves the best results on both datasets (measured by QM and IM). This demonstrates the benefit of self-play. The improvement brought by self-play is more salient on SParC than on CoSQL, while "T5-Large w/PICARD w/self-play" outperforms the vanilla T5-3B reported in related art. Therefore, self-play is an effective data augmentation method to improve performance on cross-domain context-dependent text-to-SQL, self-play simulates interactions between multiple artificial agents in order to generate a training signal in addition to supervised data, and (as shown in Table 2) models after self-play outperform baselines under varying configurations.

TABLE 2

Models After Self-play vs. SParC and CoSQL

| | | SParC | | | | CoSQL | | | |
| | | Dev | | Test | | Dev | | Test | |
| | Models | QM | IM | QM | IM | QM | IM | QM | IM |
|---|---|---|---|---|---|---|---|---|---|
| T5-Base | w/PICARD w/self-play | 62.4 | 42.1 | — | — | 53.0 | 21.5 | — | — |
| | w/PICARD w/o self-play | 57.5 | 38.6 | — | — | 49.9 | 20.2 | — | — |
| | w/o PICARD w/self-play | 57.2 | 37.5 | — | — | 50.6 | 20.4 | — | — |
| | w/o PICARD w/o self-play | 50.3 | 31.7 | — | — | 45.2 | 18.7 | — | — |
| T5-Large | w/PICARD w/self-play | 65.5 | 45.6 | 64.0 | 39.6 | 55.7 | 23.2 | 53.4 | 22.7 |
| | w/PICARD w/o self-play | 63.0 | 43.0 | 60.7 | 36.9 | 54.3 | 21.9 | 52.1 | 21.6 |
| | w/o PICARD w/self-play | 64.1 | 44.1 | — | — | 53.9 | 21.2 | — | — |
| | w/o PICARD w/o self-play | 57.5 | 38.1 | — | — | 51.4 | 20.6 | — | — |

The techniques described above, can be implemented as computer software using computer-readable instructions and physically stored in one or more computer-readable media or by a specifically configured one or more hardware processors. For example, FIG. 2 shows an environment 200 suitable for implementing various embodiments. In one example, the one or more processors execute a program that is stored in a non-transitory computer-readable medium.

As used herein, the term component is intended to be broadly construed as hardware, software, or a combination of hardware and software.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for augmenting multi-turn text-to-SQL datasets, performed by at least one processor and comprising:
   generating an SQL-to-text model to converse with a text-to-SQL model;
   pre-training the SQL-to-text model and the text-to-SQL model based on input training data;
   sampling an SQL query as a goal query of an interaction between the SQL-to-text model and the text-to-SQL model;
   generating the interaction based on the goal query, a current utterance, previous utterances in the interaction, an SQL query from a preceding turn of the interaction, and a serialized database; and
   filtering the interaction based on a last turn of the interaction and the goal query, wherein the interaction is kept or filtered out based on a similarity score between the last turn of the interaction and the goal query,
   wherein generating the interaction comprises concatenating the goal query, the SQL query from the preceding turn of the interaction, and the previous utterances in the interaction, and using a result of the concatenating as an input to the SQL-to-text model for generating a next utterance in the interaction using the SQL-to-text model.

2. The method of claim 1, wherein sampling the SQL query as the goal query comprises:
   building SQL templates using SQL queries in the input training data by replacing column and value mentions in the SQL queries with typed slots; and
   sampling an unseen database and fill the typed slots with columns and values from the sampled unseen database to form the goal query.

3. The method of claim 1, further comprising:
   concatenating the goal query with an empty context and a schema from the serialized database to generate a first value; and
   inputting the first value into the SQL-to-text model to produce a first user utterance of the interaction.

4. The method of claim 1, further comprising:
   padding an utterance from the last turn of the interaction with a stop interaction symbol, wherein the interaction ends when the SQL-to-text model decodes the stop interaction symbol.

5. The method of claim 1, wherein:
   when the similarity score is above a threshold value, the interaction is determined to be grounded to the goal query and the interaction is kept, and
   when the similarity score is below the threshold value, the interaction is determined not to be grounded to the goal query and the interaction is filtered out.

6. The method of claim 1, further comprising re-training the SQL-to-text model and the text-to-SQL model based on the input training data and the filtered interaction.

7. An apparatus for augmenting multi-turn text-to-SQL datasets, the apparatus comprising:
   at least one memory configured to store computer program code; and at least one processor configured to read the computer program code and operate as instructed by the computer program code, the computer program code including:

generating code configured to cause the at least one processor to generate an SQL-to-text model to converse with a text-to-SQL model;

training code configured to cause the at least one processor to pre-train the SQL-to-text model and the text-to-SQL model based on input training data;

first sampling code configured to cause the at least one processor to sample an SQL query as a goal query of an interaction between the SQL-to-text model and the text-to-SQL model;

synthetic interaction generating code configured to cause the at least one processor to generate the interaction based on the goal query, a current utterance, previous utterances in the interaction, an SQL query from a preceding turn of the interaction, and a serialized database;

filtering code configured to cause the at least one processor to filter the interaction based on a last turn of the interaction and the goal query, wherein the interaction is kept or filtered out based on a similarity score between the last turn of the interaction and the goal query; and utterance generating code configured to cause the at least one processor to concatenate the goal query, the SQL query from the preceding turn of the interaction, the previous utterances in the interaction, and use a result of the concatenation to generate a next utterance in the interaction using the SQL-to-text model.

8. The apparatus of claim 7, the computer program code further including:

building code configured to cause the at least one processor to build SQL templates using SQL queries in the input training data by replacing column and value mentions in the SQL queries with typed slots; and second sampling code configured to cause the at least one processor to sample an unseen database and fill the typed slots with columns and values from the sampled unseen database to form the goal query.

9. The apparatus of claim 7, the computer program code further including:

concatenating code configured to cause the at least one processor to concatenate the goal query with an empty context and a schema from the serialized database to generate a first value; and first user utterance code configured to cause the at least one processor to input the first value into the SQL-to-text model to produce a first user utterance of the interaction.

10. The apparatus of claim 7, the computer program code further including:

stopping code configured to cause the at least one processor to pad an utterance from the last turn of the interaction with a stop interaction symbol, wherein the interaction ends when the SQL-to-text model decodes the stop interaction symbol.

11. The apparatus of claim 7, wherein:

when the similarity score is above a threshold value, the interaction is determined to be grounded to the goal query and the interaction is kept, and when the similarity score is below the threshold value, the interaction is determined not to be grounded to the goal query and the interaction is filtered out.

12. The apparatus of claim 7, the computer program code further including:

re-training code configured to cause the at least one processor to re-train the SQL-to-text model and the text-to-SQL model based on the input training data and the filtered interaction.

13. A non-transitory computer-readable medium storing instructions that, when executed by at least one processor of an apparatus for augmenting multi-turn text-to-SQL datasets, cause the at least one processor to:

generate an SQL-to-text model to converse with a text-to-SQL model;

pre-train the SQL-to-text model and the text-to-SQL model based on input training data;

sample an SQL query as a goal query of an interaction between the SQL-to-text model and the text-to-SQL model;

generate the interaction based on the goal query, a current utterance, previous utterances in the interaction, an SQL query from a preceding turn of the interaction, and a serialized database;

filter the interaction based on a last turn of the interaction and the goal query, wherein the interaction is kept or filtered out based on a similarity score between the last turn of the interaction and the goal query;

wherein generating the interaction comprises concatenating the goal query, the SQL query from the preceding turn of the interaction, the previous utterances in the interaction, and using a result of the concatenating as an input to the SQL-to-text model for generating a next utterance in the interaction using the SQL-to-text model.

14. The non-transitory computer-readable medium of claim 13, wherein the instructions further cause the at least one processor to:

build SQL templates using SQL queries in the input training data by replacing column and value mentions in the SQL queries with typed slots; and sample an unseen database and fill the typed slots with columns and values from the sampled unseen database to form the goal query.

15. The non-transitory computer-readable medium of claim 13, wherein the instructions further cause the at least one processor to:

concatenate the goal query with an empty context and a schema from the serialized database to generate a first value;

input the first value into the SQL-to-text model to produce a first user utterance of the interaction; and pad an utterance from the last turn of the interaction with a stop interaction symbol, wherein the interaction ends when the SQL-to-text model decodes the stop interaction symbol.

16. The non-transitory computer-readable medium of claim 13, wherein:

when the similarity score is above a threshold value, the interaction is determined to be grounded to the goal query and the interaction is kept, and when the similarity score is below the threshold value, the interaction is determined not to be grounded to the goal query and the interaction is filtered out.

17. The non-transitory computer-readable medium of claim 14, wherein the instructions further cause the at least one processor to:

re-train the SQL-to-text model and the text-to-SQL model based on the input training data and the filtered interaction.

\* \* \* \* \*